US012762282B2

(12) United States Patent
Wang

(10) Patent No.: US 12,762,282 B2
(45) Date of Patent: Oct. 13, 2026

(54) METHODS AND SYSTEMS FOR CREATING AMALGAMATED WORK SUBSTANTIATION DATA TO SUBSTANTIATE GENUINENESS AND INTEGRITY OF WORK

(71) Applicant: Jia-Jen Wang, Hsinchu City (TW)

(72) Inventor: Jia-Jen Wang, Hsinchu City (TW)

( * ) Notice: Subject to any disclaimer, the term of this patent is extended or adjusted under 35 U.S.C. 154(b) by 210 days.

(21) Appl. No.: 18/416,048

(22) Filed: Jan. 18, 2024

(65) Prior Publication Data

US 2024/0249030 A1 Jul. 25, 2024

(30) Foreign Application Priority Data

Jan. 19, 2023 (TW) ................................ 112102479

(51) Int. Cl.
*G06F 21/64* (2013.01)
*G06V 10/75* (2022.01)

(52) U.S. Cl.
CPC ............ *G06F 21/64* (2013.01); *G06V 10/751* (2022.01)

(58) Field of Classification Search
None
See application file for complete search history.

(56) References Cited

U.S. PATENT DOCUMENTS

2003/0023851 A1* 1/2003 Peha ..................... H04L 9/3236 713/176
2020/0119923 A1* 4/2020 Tomlinson ............ H04L 9/3213
2024/0303379 A1* 9/2024 Yeo ......................... G06F 21/64

FOREIGN PATENT DOCUMENTS

CN 1719376 A * 1/2006 ............. G06F 21/36
CN 105493137 A * 4/2016 ........... G06T 1/0028
JP H1031660 A * 2/1998 ............. G06F 9/451
JP 2000215379 A * 8/2000 ........... H04L 9/3263
JP 2013101590 A * 5/2013

* cited by examiner

*Primary Examiner* — Ali H. Cheema

(57) ABSTRACT

Methods and systems for forming work amalgamated substantiation data for work authentication are describes herein. In an implementation, a method implemented by a system comprises steps of obtaining an image file of a work along with information of a creator or an owner, extracting pixel data of the image file, computing a work substantiation data based on the pixel data, computing a creator substantiation data based on the information of the creator or the owner, combining the work substantiation data with the creator substantiation data to generate an amalgamated work substantiation data of the work, and integrating the amalgamated work substantiation data into the image file of the work and/or a tangible work, wherein the image file, the creator substantiation data and the amalgamated work substantiation data are transmitted to an authenticator or a user of the system to substantiate genuineness and integrity of the work.

15 Claims, 10 Drawing Sheets

| 701 | 703 | 704 | 705 | 707 | 709 | 711 | 713 | 715 | 717 |
|---|---|---|---|---|---|---|---|---|---|
| Serial Number | type of work by classification | work title | creation time | original creation author information | first work owner information | second work owner information | re-creation owner information | the number of times of re-creations | historical data of re-creations |

FIG. 7

METHODS AND SYSTEMS FOR CREATING AMALGAMATED WORK SUBSTANTIATION DATA TO SUBSTANTIATE GENUINENESS AND INTEGRITY OF WORK

CROSS-REFERENCE TO RELATED APPLICATIONS

This application claims the benefits of the Taiwan Patent Application Serial Number 112102479, filed on Jan. 19, 2023, the subject matter of which is incorporated herein by reference.

BACKGROUND

Field of the Disclosure

This disclosure relates to service of work substantiation. The work comprises artwork, antique, industrial design, commercial design, cookery, poet, musical composition, etc. The work comprises tangible work, digital work, and combination of various works. It is related to systems and methods of device, computer, network and cloud.

Description of Related Art

It usually takes a long time to substantiate the genuineness of a work and it is a painful and tough task. Still, it is quite often that the result is uncertain. The technique of checksum could be used for checking whether a transmitted file or a digital image has been corrupted or tampered with. It checks whether the content of a file has been changed. This technique does not identify the creator of the work. There are limitations on conventional technologies on substantiating the correctness and genuineness of digital files. The functions of author protection and integration of creators and works on existing platforms are still deficient.

SUMMARY

Different from conventional method of substantiating digital data, this disclosure proposes a method and a work substantiation system with the function of generating work substantiation data, wherein the method for generating work substantiation data is applied to a computer system, which can be a client-server system or a cloud. The type of system comprises a distributed system, a distributed ledger, a block chain, or a system of other types of architecture.

The disclosure illustrates a method of forming work substantiation data and a work substantiation system. The works are not limited to two-dimensional works, and can also be three-dimensional works or other types of works (such as objects created by using light, laser, etc.). The work substantiation system can calculate substantiation data for tangible works or digital works. The servers or distributed systems may store relevant substantiation data for query, and can allow users to re-creation work (e.g., artwork). Through advanced substantiation, it can provide more secure and ideal integration services between substantiation and works to enhance the value of works.

In an embodiment, the method of generating work substantiation data is implemented in a system, wherein the image file of a work and the relevant information of the work, including the creator or owner information, is obtained from the user. The pixel data is extracted from the image file. A work substantiation data of the work is computed based on the pixel data of the image file. A creator substantiation data is computed according to the information of the creator. Afterwards, combining the substantiation data of the work with the substantiation data of the creator, and calculating the substantiation data, the substantiation data can be amalgamated into the image file.

In an embodiment, a system implements a work substantiation platform, with a database for storing each individual creator or owner information, and storing work related information, the digital files of each work, and the history of each work.

In an embodiment, when the work is a tangible work, the tangible work can be scanned to obtain image data. After the substantiation data is obtained, the substantiation data is amalgamated or attached to the tangible work.

Further, a tangible work can be scanned by a three-dimensional scanning technology, and then a digital file is obtained after encoding by lossless encoding, and stored in the system along with substantiation data.

Further, when the substantiation data is obtained, the substantiation data can be mixed into the image file according to a predetermined rule. For example, a predetermined rule is to set the substantiation data to be mixed into one or a plurality of pixels of the image file; or the predetermined rule is to set the substantiation data to be mixed into one or a plurality of selected image frames, and be mixed into one or a plurality of pixel positions within each frame.

Preferably, the information used to calculate the creator's substantiation data also includes the creator's signature handwriting/penmanship, signature handwriting strength at each position of signature, biological characteristics, or other identity data.

In an embodiment, when calculating the work substantiation data, the creator substantiation data, and combining the work substantiation data and the creator substantiation data, the calculation is to generate a hash value calculated by a hash algorithm.

When the substantiation data is combined into the image file and transmitted to a server system or distributed system, a corresponding combination data between the work and the creator is formed; and the authenticity, uniqueness, and indivisibility, and integrity of the work and the creator (or owner) are constructed.

In an embodiment, the method for forming the substantiation data of the work can also be used in the application of the re-creation. First, the method begins with, obtaining a first work from the system, and the information of the first work, and the first work substantiation data. The information of first work includes the information of the creator (or owner) of the first work, so that the first work can be re-created to produce the second work. Second, it obtains the pixel data of the second work and the information of the second creator (or owner) of the second work, and calculate the amalgamated work substantiation data of the second work. The image file of the second work and the second substantiation data are stored in the system. An authenticator or a user who obtains the second work can substantiate the genuineness and integrity of the second work.

Further, when the system obtains the image file of the second work and the second substantiation data, it can be used to build up the relationship information between the second work and the first work in the system. Among them, the data and the package that records the history of the first/second work and the first/second substantiation data in the system can be used as the relationship information of the first work and the second work, comprising: a serial number, a type of work, a creation time, and an original creation information of the author of the first work, information of the owner of the first work, information of the owner of the second work, information of the owner of the re-creation work, the number of times of the re-creation, and historical data of the re-creation.

In an embodiment of the work substantiation system, the work substantiation system includes a system. The system implements a work substantiation platform, and a database is used to store the information of creator (or owner) of each work and related information, as well as the digital files of each work. The system provides the establishing history of each work, and implements the method of generating work substantiation data.

BRIEF DESCRIPTION OF DRAWINGS

FIG. 7 shows a diagram of an embodiment of a data packet recording the course of substantiation data of a work.

DETAILED DESCRIPTION OF EMBODIMENT

The figures in present disclosure are only for illustration and description, and are not used to limit the scope of disclosure. The word of image in the disclosure is not limited to still image. The word of image in the disclosure comprises still image, dynamic image, video, and other types of image (including but not limited to scanned (2D, 3D scanning), photographed (360-degree surround photography, multi-view 3D stereoscopic photography, or special light photography, etc.). Some examples of hashing or similar operation are BLAKE-512, AES-128, SHA-256, SHA-512, keccak256. In this disclosure, the function of "hash" maybe replaced by other algorithms (such as lossless compression, error-correction encoding, ciphers, encryption algorithm, checksums, or AES, DES, RSA etc.). In this disclosure, the function/algorithm used may be named as "hash-like" function. The primary requirement of these functions is that the output of the function should be unique, and the original content cannot be obtained through inverse function. The algorithm is not limited to hash function.

The following are some embodiments to illustrate the implementation of the present disclosure, and those skilled in the art can understand the advantages and effects of the present disclosure from the contents disclosed in this description. The present disclosure can be implemented or applied through other different embodiments, and various modifications and changes can be made to the details in this specification based on different viewpoints and applications without departing from the concept of the present disclosure. In addition, the drawings of the present disclosure are only for simple illustration, and are not drawn according to the actual size. The following embodiments will further describe the relevant technical content of the present disclosure in detail, but the disclosed content is not intended to limit the protection scope of the present disclosure.

Figure 1:
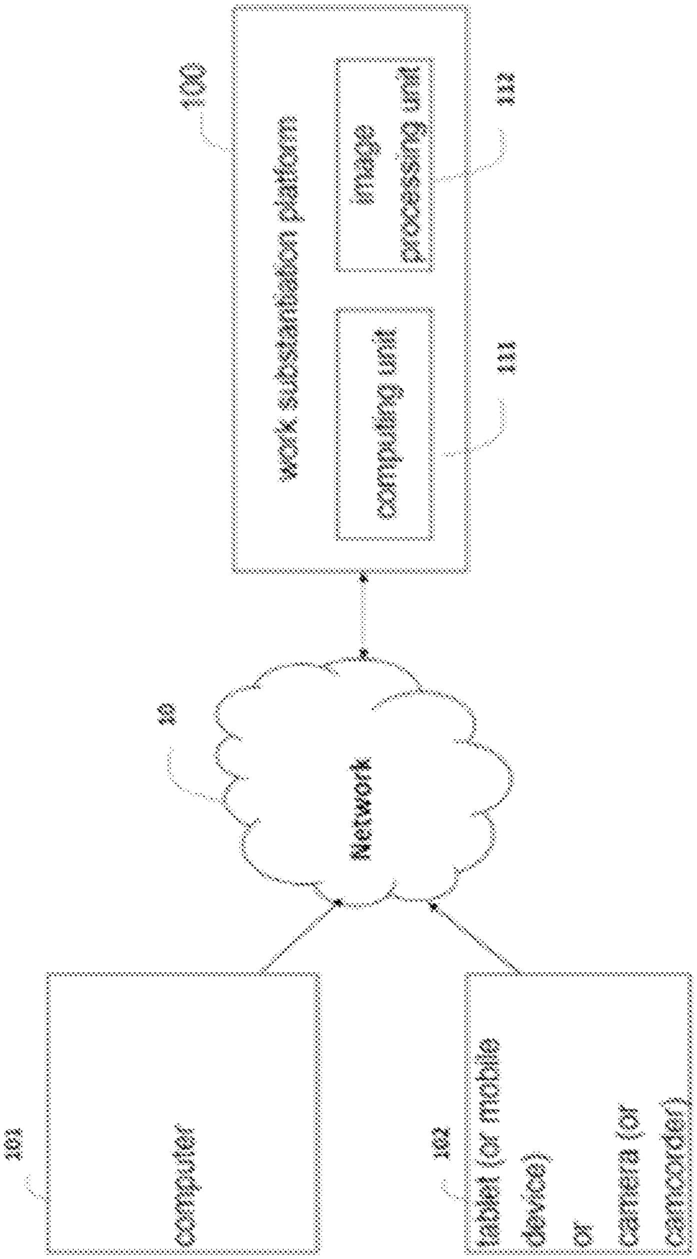
FIG. 1 illustrates the framework embodiment diagram of the work substantiation system.

FIG. 1 shows a diagram of an embodiment of the architecture of the work substantiation system. In an embodiment of the system architecture shown in FIG. 1, a system is to implement a work substantiation platform 100. The system, operating on a network architecture with computation and storage capabilities, can provide user services of creation and work substantiation through the network 10. Processors and software are used to implement various functions in the system. The computing unit 111 and image processing unit 112 are shown in the figure. The computing unit 111 is used to perform substantiation computation and digital file encode/decode operations, and the image processing unit 112 provides image processing function. The work substantiation platform 100 has a database for storing digital images of each work, substantiation data, creators (or owners) and related information, and records the history of each work.

At the user end, the user can connect to the work substantiation platform 100 through the network 10 with various electronic devices such as the first user device 101 or the second user device 102. In an embodiment, the user device should first log in and be bound to the work substantiation platform 100 in consideration of security. The users register as members before using the service of the work substantiation platform 100.

The work substantiation platform 100 is built on the system to implement the method of forming work substantiation data. Users can transmit the digital image of the work to the work substantiation platform 100. The work substantiation platform 100 obtains the image file of the work and related information about the work, such as creator (or owner) information, wherein the image processing unit 112 captures the pixel data in the image file (if there is an inscription or signature seal along with the work, it is also captured). The computation unit 111 computes the work according to the pixel data of the image file to produce a work substantiation data, and compute a creator substantiation data according to the creator information of the work, so as to combine the work substantiation data and the creator substantiation data to generate an amalgamated substantiation data. Furthermore, the creator substantiation data can be amalgamated into the image file of the work, and the integration method can amalgamate the creator substantiation data into the digital image according to the rules set in advance by the system.

In addition to the above substantiation data generation method, there is another embodiment of the method for forming work substantiation data. The information that can also be optionally added or incorporated into the still image, or dynamic image (e.g., video) comprises the combination of any one or more of the following types:

(a) Creator or owner-related information: including various combination information about creators (or owners), such as name, date of birth, address, school study history, and various identification information, etc.;

(b) source of image, and history information of producing still image or dynamic image, including information about the equipment used to producing image, such as the model, serial number, and MAC (Media Access Control) address of the machine, etc.;

(c) if the dynamic image is transmitted through the network, attaching the information and added or amalgamated into the dynamic image, the information comprises the IP address of the machine, GPS (global positioning system) of device, physical location and/or altitude, etc.;

(d) For dynamic image, if the content is directly photographed from an actual object, some machine learning algorithms or other artificial intelligence methods can be applied to this process: extracting some features of the image of actual object, for example, the features of major components such as the features of face of people or animals, characteristics of motion features, or features of architecture.

Depending on applications, the system selects some of the combination of above features; selectively adds or amalgamates into the still image, dynamic image or video. The method of adding and blending into images is proprietary, and the process of adding or blending information can be executed synchronously on the machine, while a user shooting or making a still/dynamic image.

The work substantiation platform 100 also provides re-creation services. After the user logs in to the work substantiation platform 100, he can provide by his own or obtain a work he wants to create from (it can be called the first work). The substantiation data of the first work is obtained; then the user may carry out re-creation. The method comprises applying a specific style, or modifying (such as changing the object, adding a word, a phrase, a sentence, a poem, or in a different way), and a second work is formed. Similarly, the digital image of the second work can be transmitted, and then the image processing unit 112 in the work substantiation platform 100 can obtain the features of the image, and the computing unit 111 can compute the substantiation data of the second work based on the work substantiation data of second work and the creator substantiation data of second work.

One of the embodiments is that the work substantiation platform 100 adopts a client-server architecture, and the work substantiation platform 100 uses a server system to realize system-side platform services, providing end users to form work substantiation data, providing substantiation service, and establishing substantiation service for re-creation.

In an embodiment. the platform can be mixed with a central server or intermediary machines. The intermediary machines or edge computing machines (or edge cloud) provide some local processing (such as image processing, substantiation data computation, etc.) services. And some other functions (such as pod deployment service, complicated algorithm computation, data storage, member management, etc.) of platform may be performed by a central server.

In the other embodiment, the work substantiation platform 100 can also adopt a decentralized system architecture such as distributed ledger or blockchain. As shown in the work substantiation platform 100 in FIG. 1, the digital files of works and their substantiation data can be transmitted to some specific blockchain or peer-to-peer network nodes to run calculations to establish records that cannot be tampered with in the blockchain, to realize the application of substantiating the genuineness, uniqueness, complete integration and security protection of works.

Figure 2:
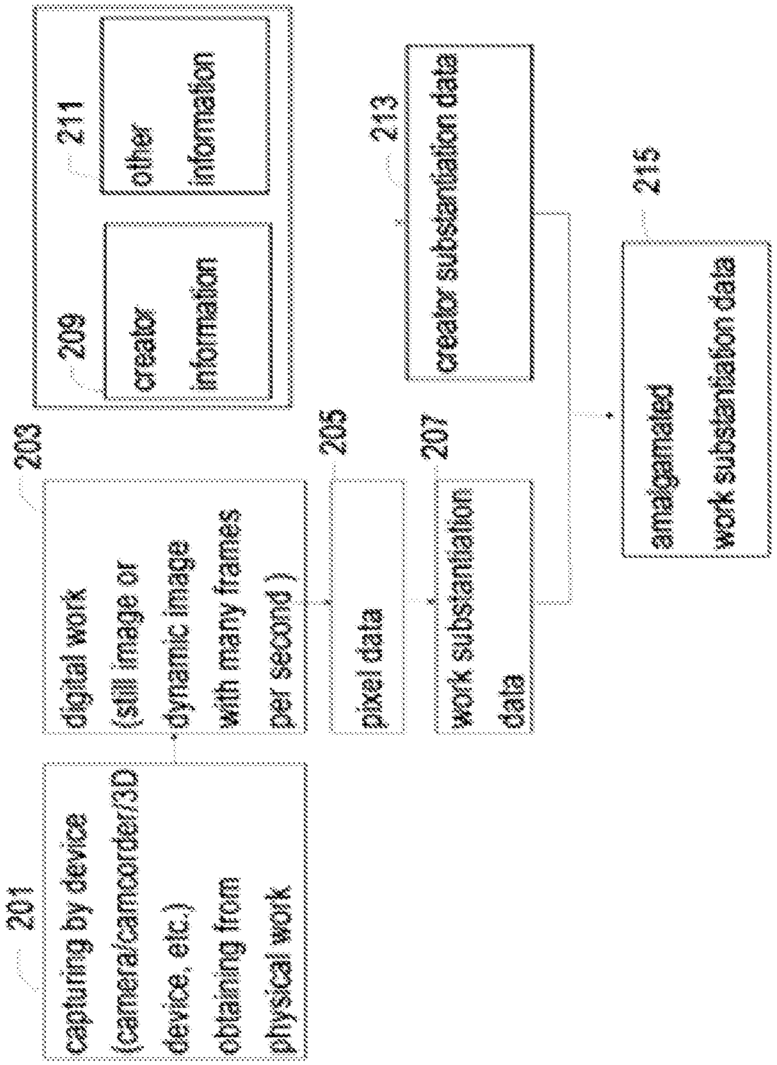
FIG. 2 illustrates an embodiment diagram of the flow process of forming work substantiation data.

In an embodiment, the process of executing the method of forming amalgamated work substantiation data using the work substantiation platform 100 is shown in FIG. 2. The work itself can be a tangible work, and the tangible work can be scanned (2D, 3D scanning), photographed (360-degree surround photography, multi-view 3D stereoscopic photography, or special light photography), etc. The digital file (still image or dynamic image file, shown as a digital work 203 in FIG. 2) is obtained from above methods. On the other hand, the work itself can also be a digital work.

Through specific software process, it can be a software program running on an end user device, or a software method running on a work substantiation platform, or a software running on a distributed system node to compute the amalgamated substantiation data based on the image data of the digital work 203. The pixel data 205 is used to compute the work substantiation data 207. For example, the work substantiation data 207 can be computed by sampling pixel information from the pixel data according to predetermined methods.

Besides, the creator information 209 is obtained, which can be different combinations of various information of the creator (or owner) of the work, such as name, passport numbers, and identification numbers that can identify the identity of the creator (or owner), signature images or signature traces or information therein, biometric features (such as fingerprints, faces, voiceprints, etc.), user identification data on the work substantiation platform (such as membership ID), or other information 211, such as other descriptions related to the work, creation time, locations, none-disclosure hidden information of images, or information of the creation process of the work, the size and resolution of the work, etc. While the creator substantiation data 213 is generated, and it is combined with the work substantiation data 207 to form the amalgamated work substantiation data 215.

In an embodiment, the amalgamated substantiation data 215 obtained by combining the creator substantiation data 213 and the work substantiation data 207 can be generated by adding the values of the former two substantiation data (213 and 207), or by computed by a specific software algorithm. Moreover, in the above process, after obtaining the digital files and relevant information of the work, the system can execute the hash algorithm (or it can also be a proprietary algorithm of the system) at each stage of process, and the substantiation data is a hash value. These substantiation data are stored in a database, or in nodes of a decentralized system. What's more, the process of obtaining the digital work 203 corresponding to the tangible work 201 can use a three-dimensional scanning technology to scan the tangible work 201, and then use a lossless code to obtain a digital file. The work substantiation data, creator substantiation data, and amalgamated work substantiation data are stored in a system (can be stored in a database, or on the blockchain).

When the amalgamated substantiation data 215 of the tangible work 201 is obtained through the process shown in FIG. 2, in one embodiment, since the amalgamated substantiation data can be a unique string, the amalgamated substantiation data can be printed and attached to the tangible work 201. When a user purchases the tangible work 201, the substantiation data of the work can be generated again with the new owner information by the above-mentioned process in FIG. 2. The authentication of the new owner can be done through substantiating the amalgamated work substantiation data 215 attached to the tangible work 201. The amalgamated work substantiation data is unique. Hence, the authenticity and integrity of the tangible work 201 and creator (or owner) is constructed.

For the digital work 203, the amalgamated work substantiation data 215 can be merged into the image file according to specific rules to produce a new image file with hidden amalgamated work substantiation data 215 within it, and then the new image file is provided to the system. This can also provide authenticator/assessor another method to help the person who obtain the work substantiate the genuineness and integrity of the work.

Figure 3:
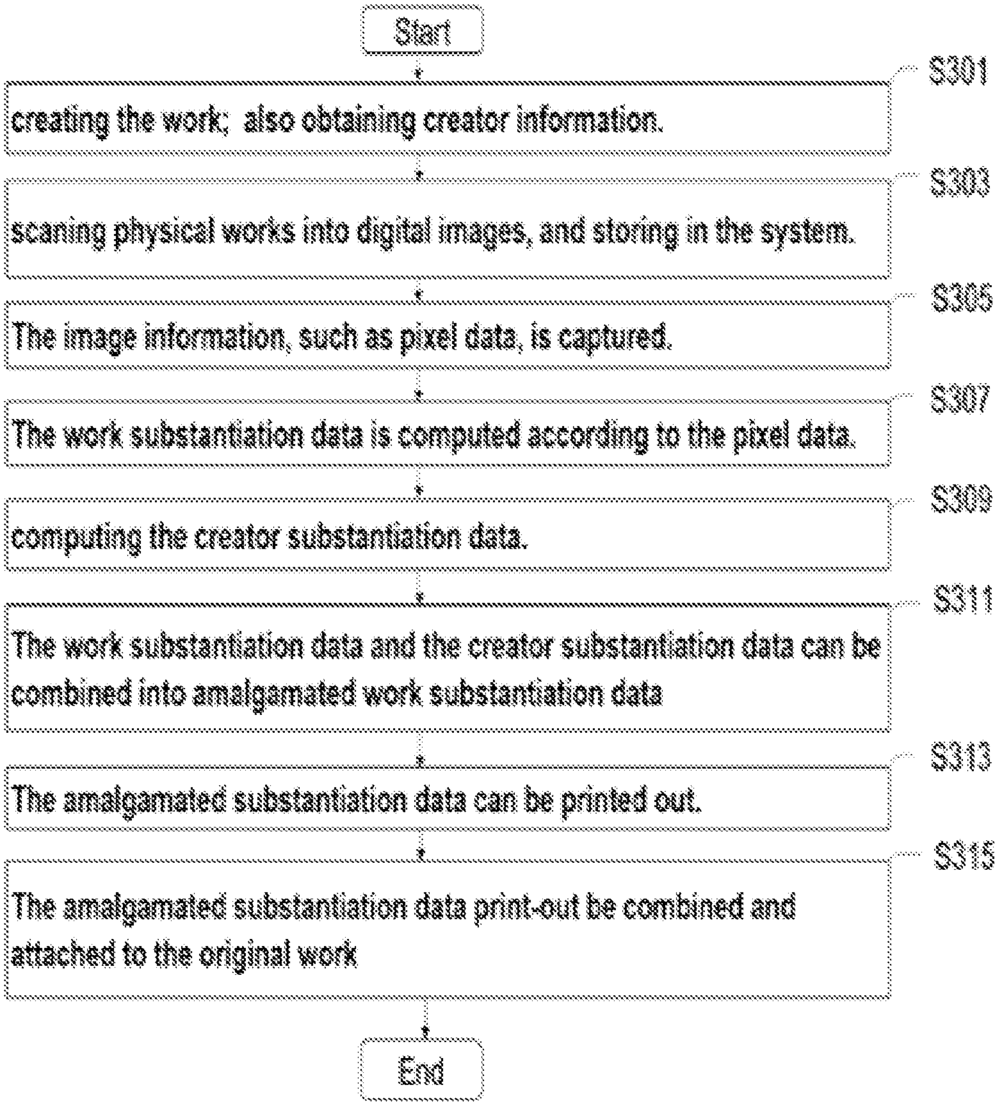
FIG. 3 illustrates a flow chart of the process of forming work substantiation data of an embodiment of the present disclosure.

Based on the above operation of the work substantiation platform and the description of related embodiments, the flow chart of the embodiment of the method for generating work substantiation data is shown in FIG. 3.

Since the creation of the work, the relevant information, such as creator (or owner) information, or member information, is also obtained at the same time by the work substantiation platform (step S301). For tangible works, they need to be scanned into digital images, which can then be encoded through lossless encoding. The digital file is obtained and stored in the system of the work substantiation platform (step S303). If it is a digital work, the step of scanning can be ignored, and the lossless encoding is applied to the digital file. The encoded file is stored in the system.

The image information, such as pixel data, can be captured through software services on the work substantiation platform or software programs executed on end-user devices (step S305); and the work substantiation data can be computed according to the pixel data (step S307). Computing the creator substantiation data (step S309), the work substantiation data and the creator substantiation data can be combined (amalgamated) to generate amalgamated substantiation data (step S311).

For the tangible work, the amalgamated substantiation data can be printed out (step S313) to be attached to the original work (step S315). Taking a digital work as an example, the substantiation data can be a string format, so the relevant value can be embedded (through a specific algorithm method) into the image of the digital work by means of software.

The work substantiation platform allows users to perform re-creations, including applying a specific style, modifying it, or combining another works. The embodiment process can refer to the embodiment flow chart of the method for combining different works to form amalgamated work substantiation data, shown in FIG. 4.

In an embodiment, after obtaining the digital file of the work, the system can execute the hash algorithm of each stage, and store the hash value of the verified work, or store the combination of the work with other works in the database. The authenticator can obtain the work and substantiation data through the work substantiation platform for substantiation and authentication.

Figure 4:
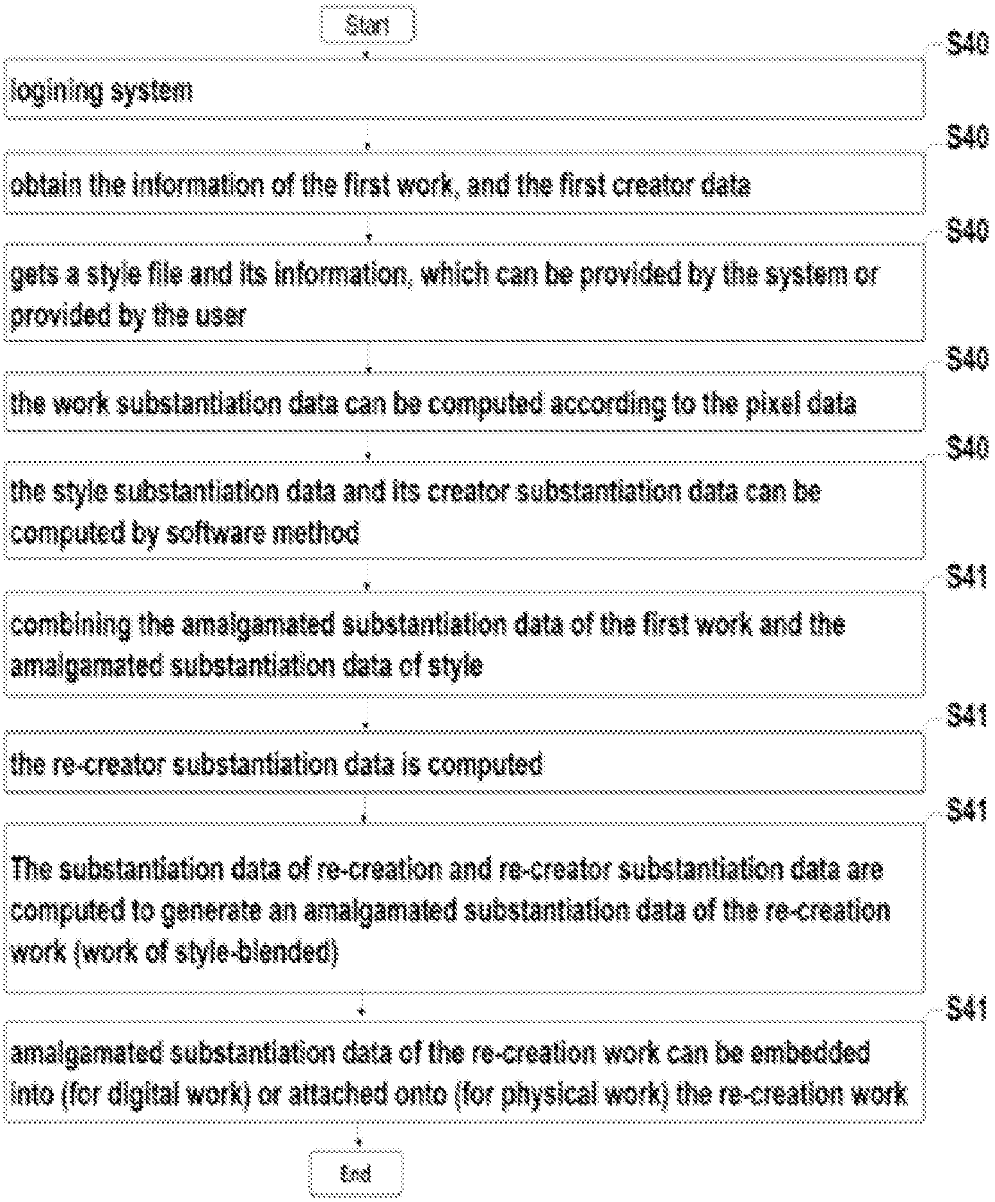
FIG. 4 illustrate a flow chart of a method for combining different works to form a work substantiation data in an embodiment.

In the process shown in FIG. 4, the user logs into the system (step S401), and obtain the information of the first work, and the first creator data (step S403), which comprises the information about the first creator (or first owner) of the first work.

For works of image, in an embodiment, artificial intelligence methods such as machine learning (comprising deep learning) can be used for re-creation, for example, Generative Adversarial Network (GAN) can be used to combine the first work with style data (such as surface texture or various painting styles) is transformed into a new work, which can also be mixed with the information of the new owner (re-creator) to obtain new amalgamated substantiation data. In this process, the user can perform re-creation on the first work. One of which is to apply a specific style to the first work. The user gets a style file and its information, which can be provided by the system or provided by the user (step S405). At this time, the style substantiation data and its creator substantiation data can be computed by software method (step S407), to form a style amalgamated substantiation data.

In the re-creation, the style can be applied to the first work to generate the second work (step S409). Similarly, the second substantiation data of the second work can also be computed. In an embodiment, the amalgamated substantiation data of the first work and the amalgamated substantiation data of the style work are used to compute the second substantiation information of the second work. By combining the amalgamated substantiation data of the first work and the amalgamated substantiation data of style, the substantiation data of re-creator (step S411) is formed. It is mostly likely the re-creator is not the creator of the first work. The re-creator substantiation data is computed (step S413). The substantiation data of re-creation and re-creator substantiation data are computed to generate an amalgamated substantiation data of the re-creation work (that is, the work of style-blended) (step S415). The amalgamated substantiation data of the re-creation work can be embedded into (for digital work) or attached onto (for tangible work) the re-creation work (step S417).

The re-creation work related information (image files and amalgamated re-creation substantiation data) is transmitted the system. The authenticator (or the user who obtains the re-creation work) can substantiate the re-creation work. Moreover, if any of the information changes, such as the re-creator (owner) modifying the content of the work, changing the style applied to the image, or updating the re-creator (owner) information, etc., it is necessary to re-compute the substantiation data.

Figure 5:
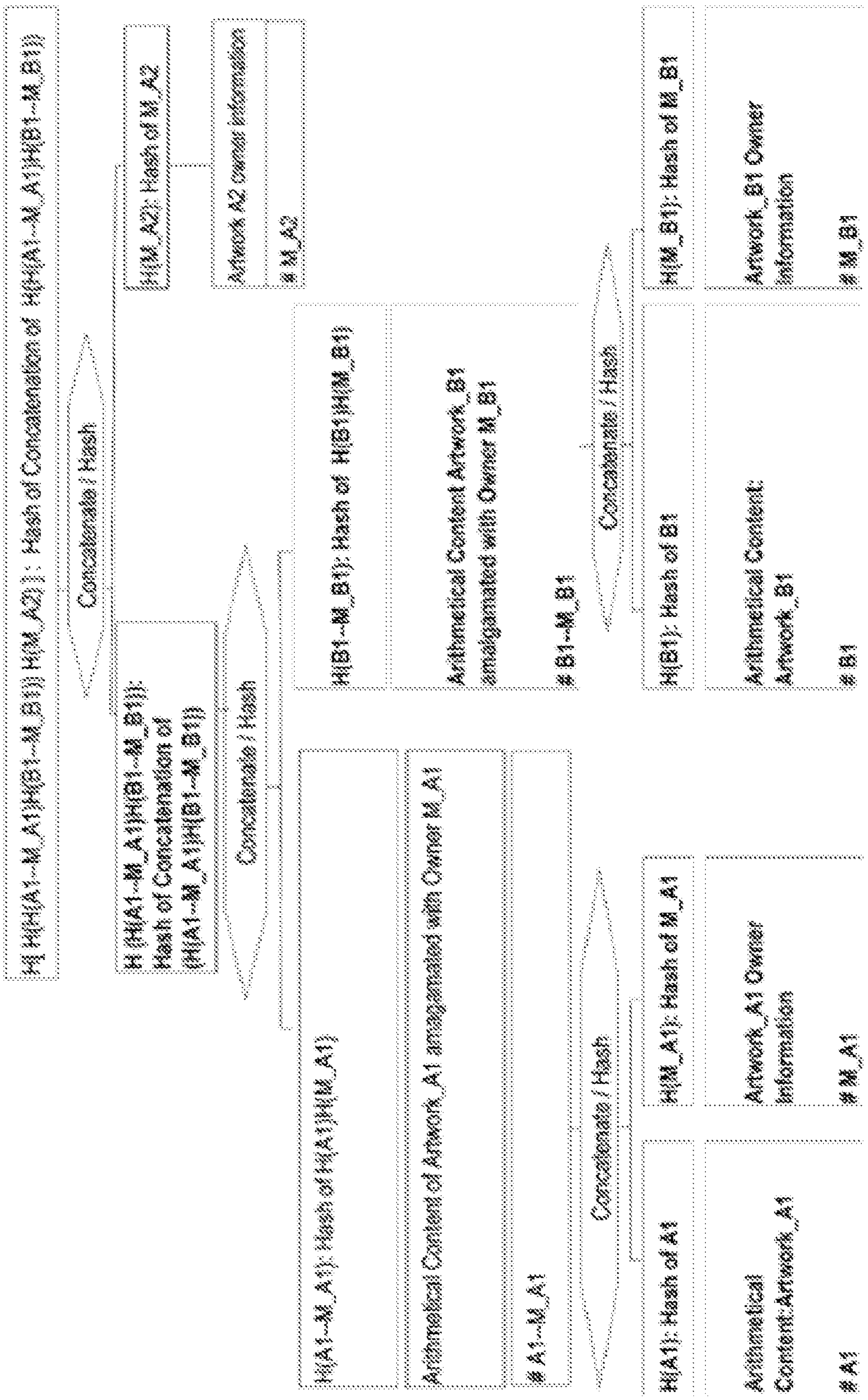
FIG. 5 illustrates an embodiment diagrams of each stage for forming amalgamated work substantiation data of two artworks.

FIG. 5 illustrate a diagram of an embodiment of blending an artwork with another artwork. A diagram of the computing diagram of each stage of combining different works in an embodiment is shown. The illustration shows that the information of the work A1 and its owner M_A1, and the information of the work B1 and its owner M_B1 are obtained first. In the first hash computation stage, the first hash computation is performed for each data. Hash value of work A1(Hash(A1)), hash value of owner M_A1 (Hash (M_A1)), hash value of work B1(Hash(B1)), and hash value of owner M_B1 (Hash(B1)) are computed.

In the second hash computation, the hash value of each work is mixed with the hash value of its respective owner. The second hash computation stage is performed to obtain the mixed work hash value along with the hash value of its owner, that is, shown in the figure, HA1M_A1=Hash(H(A1) H(M_A1)) and HB1M_B1=Hash(H(B1)H(M_B1)).

In the third hash computation stage, after mixing the two works, the system performs the third hash computation to obtain the hash value $H[H_{A1M\_A1}H_{B1M\_B1}]$=Hash of Concatenation $(H_{A1M\_A1}H_{B1\_MB1})$ for the blended work shown in FIG. 5. If the result of this blended work has a new owner M_A2, it first computes the hash value Hash(M_A2) of the new owner, and then mix it with the hash value $H[H_{A1M\_A1}H_{B1M\_B1}]$0 of the blended work. In the fourth hash computation stage, it computes the mixed hash value, $H[H(H_{A1-M\_A1}H_{B1-M\_B1})H_{M\_A2}]$, which is the amalgamated work substantiation of A1 and B1.

Figure 6:
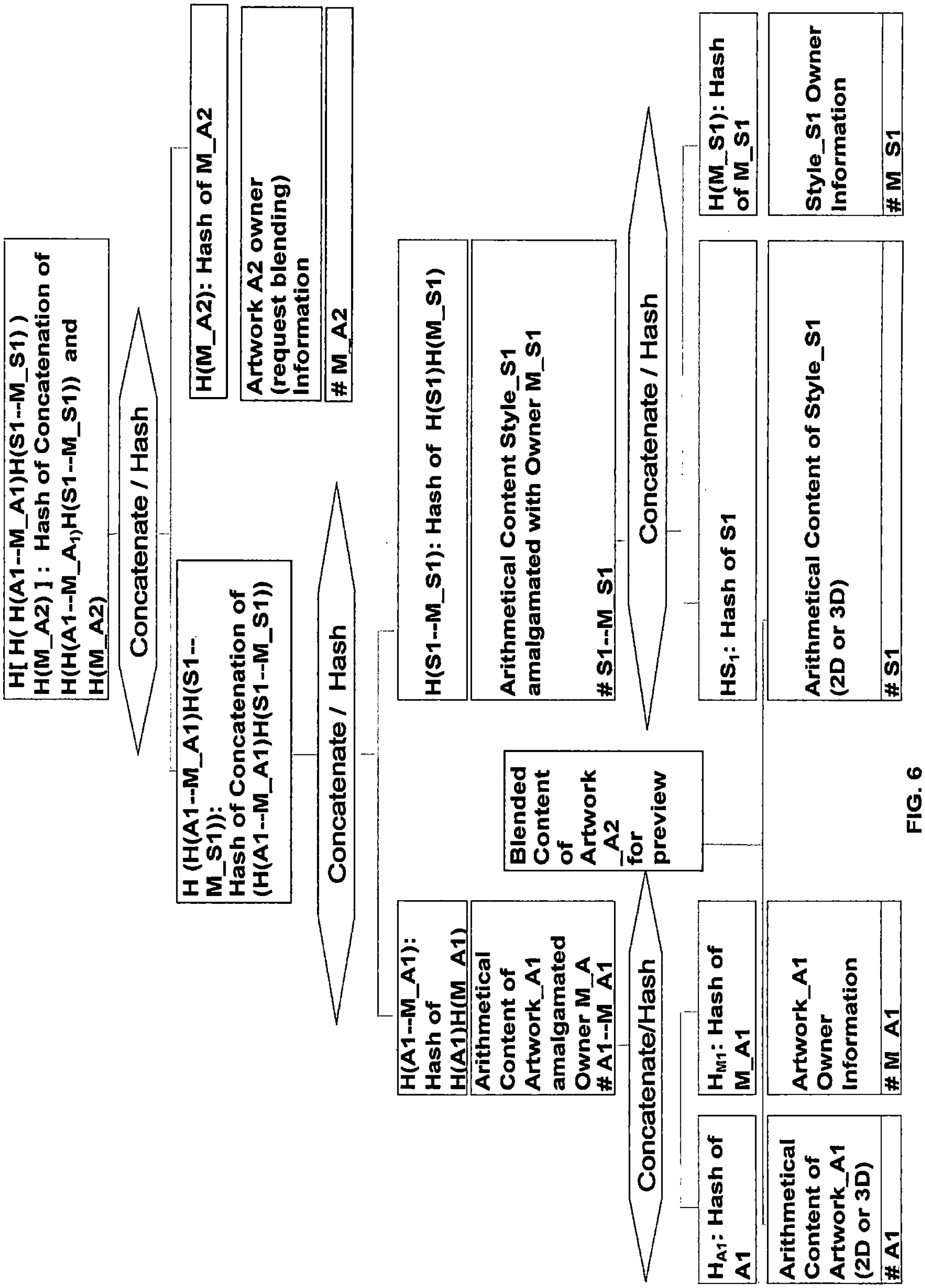
FIG. 6 illustrates an embodiment diagrams of each stage for forming amalgamated work substantiation data of an artwork and a style.

FIG. 6 illustrate a diagram of an embodiment of blending an artwork with a style. The illustration shows that the information of the work A1 and its owner M_A1, and the information of the style S1 and its owner M_S1 are obtained first. In the first hash computation stage, the first hash computation is performed for each data. Hash value of work

A1(Hash(A1)), hash value of owner M_A1 (Hash(M_A1)), hash value of style S1(Hash(S1)), and hash value of owner M_S1 (Hash(S1)) are computed.

In the second hash computation, the hash value of each work is mixed with the hash value of its respective owner. The second hash computation stage is performed to obtain the mixed work hash value along with the hash value of its owner, that is, shown in the figure, $H_{A1M\_A1}$=Hash(H(A1) H(M_A1)) and $H_{S1M\_S1}$=Hash(H(S1)H(M_S1)).

In the third hash computation stage, after mixing the work with the style, the system performs the third hash computation to obtain the hash value $H[H_{A1M\_A1}H_{S1M\_S1}]$=Hash of Concatenation ($H_{A1M\_A1}H_{S1\_MS1}$) for the style-transferred work shown in FIG. 6. If the result of this style-transferred work has a new owner M_A2, it first computes the hash value Hash(M_A2) of the new owner, and then mix it with the hash value $H[H_{AIM\_A1}H_{S1M\_S1}]$ of the style-transferred work. In the fourth hash computation stage, it computes the mixed hash value, $H[H_{A1-M\_A1}H_{S1-M\_S1})H_{M\_A2}]$, which is the amalgamated work substantiation of A1 and S1.

Based on the above two approach of re-creation, in this system, when a re-creation is obtained, the image file (pixel data) of the second work can be obtained. When incorporating the first work data (and the first work substantiation data) with the second work (and second work substantiation data), the association information between the first work and the second work can be established in the server system or distributed system. This association information may be a data packet that records the construction history of the second work and the second amalgamated work substantiation data. In an embodiment, a data packet example is shown in FIG. 7. (This example is not intended to limit the disclosure.) The data package, shown in the example records, comprises serial number 701, type of work by classification 703, work title 704, creation time 705, original creation author information 707, first work owner information 709, second work owner information 711, and re-creation owner information 713, the number of times of re-creations 715, and the historical data of re-creations 717, etc.

The work substantiation platform provides the historical information of each work through the system. The system may use artificial intelligence technology, such as machine learning, feature extraction, to detect the attributes of each work for classification, and also provides users the information similar to FIG. 5 or FIG. 6. The tree diagram of represents the history of the entire construction of original work and new work.

Figure 8:
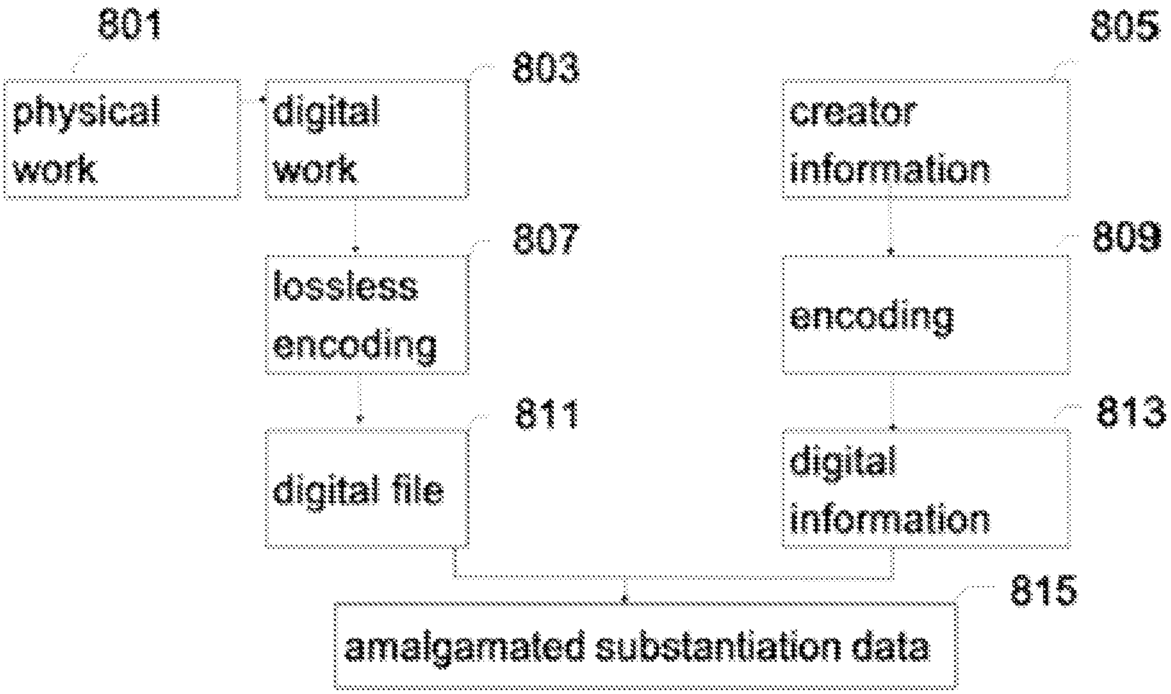
FIG. 8 illustrates an embodiment diagram of the flow process for forming amalgamated work substantiation data.

For tangible works (physical work), the process of establishing amalgamated substantiation data can refer to the embodiment diagram shown in FIG. 8. The purpose of lossless encoding 807 is to achieve lossless compression through a method of non-destructive approach. Since the data will not be destroyed after compression, the original work may be retained. Examples of lossless coding include Shannon-Fano coding, Huffman coding, LZW (Lempel-Ziv-Welch) coding, and Lossless Discrete Cosine Transform.

The work substantiation platform may provide partial image files for users to browse and search. The system can provide low-resolution, thumbnail, gray scale, watermarked, or altered work for user preview. The creator, owner, and related description can be browsed by user. (Some sensitive information can be hidden or simplified.)

In FIG. 8, the system obtains creator information 805, and then encodes 809 to form creator substantiation data 813 of the creator (or owner, or other information). Amalgamated substantiation data 815 can be computed from the digital file 811 obtained from the work and related creator substantiation data 813. (The hash calculation described in embodiments is an example). When there is any change among the tangible work 801 or digital work 803 or the creator substantiation data 813, the amalgamated substantiation data 815 become different, so the amalgamated substantiation data 815 is used to substantiate the genuineness and integrity of various digital works 803 in the work substantiation platform.

In an embodiment, when obtaining substantiation data of a tangible work or a digital work, the substantiation data can be combined with the work in a specific way. For a tangible work, the substantiation data can be obtained by a hash algorithm to obtain a hash value string, which may be printed to be attached to the tangible work, or form a substantiation pattern for substantiation.

In an embodiment, the creator can merge this string into the work, and use the color close to the background, the same paint material as the work, and draw this string in some positions of the work without affecting the presentation of the theme. Before drawing, artificial intelligence methods (such as contour detection, image segmentation, and image classification, but not limited to these) can be used to find out the attributes of different blocks in the work, so as to determine where and how to merge or attach substantiation data to the work. After drawing, if the drawing area is within the scope of the subject of the work (not at background), another scan can be performed after drawing to obtain an amalgamated work substantiation data after merging the substantiation data to the work.

In an embodiment, the system may combine some data, comprising:

(a) the digital image data of the subject area (excluding background) before drawing the substantiation data. (In case someone tampers with the digital file, such as replacing the content within the scope of the subject with improper content, the data of (a) would be different.)

(b) the creator substantiation data.

(c) the amalgamated work substantiation data obtained by scanning after drawing the substantiation data.

After combining the (a)(b)(c) data, these incorporate into a paired bundle and amalgamate (bundle and amalgamate), which are encoded and stored in a data system that cannot be tampered with. If the amalgamated substantiation data obtained by scanning the substantiation data in (c) item above is stolen, because the thieves do not know the method of embedding the substantiation data, and have no way to change the creator (or owner) into their own. Moreover, thieves cannot obtain the original works for digitization, nor can they produce imitations from the original works.

For digital works, such as a single image or a video (film) formed by continuous images, whether it is for the original work (which can be called the first work) or the second work obtained through re-creation, the corresponding substantiation data (the first creator substantiation data or the second creator substantiation data) can be mixed in the image file of the corresponding work (the first work or the second work) according to a predetermined rule.

Figure 9:
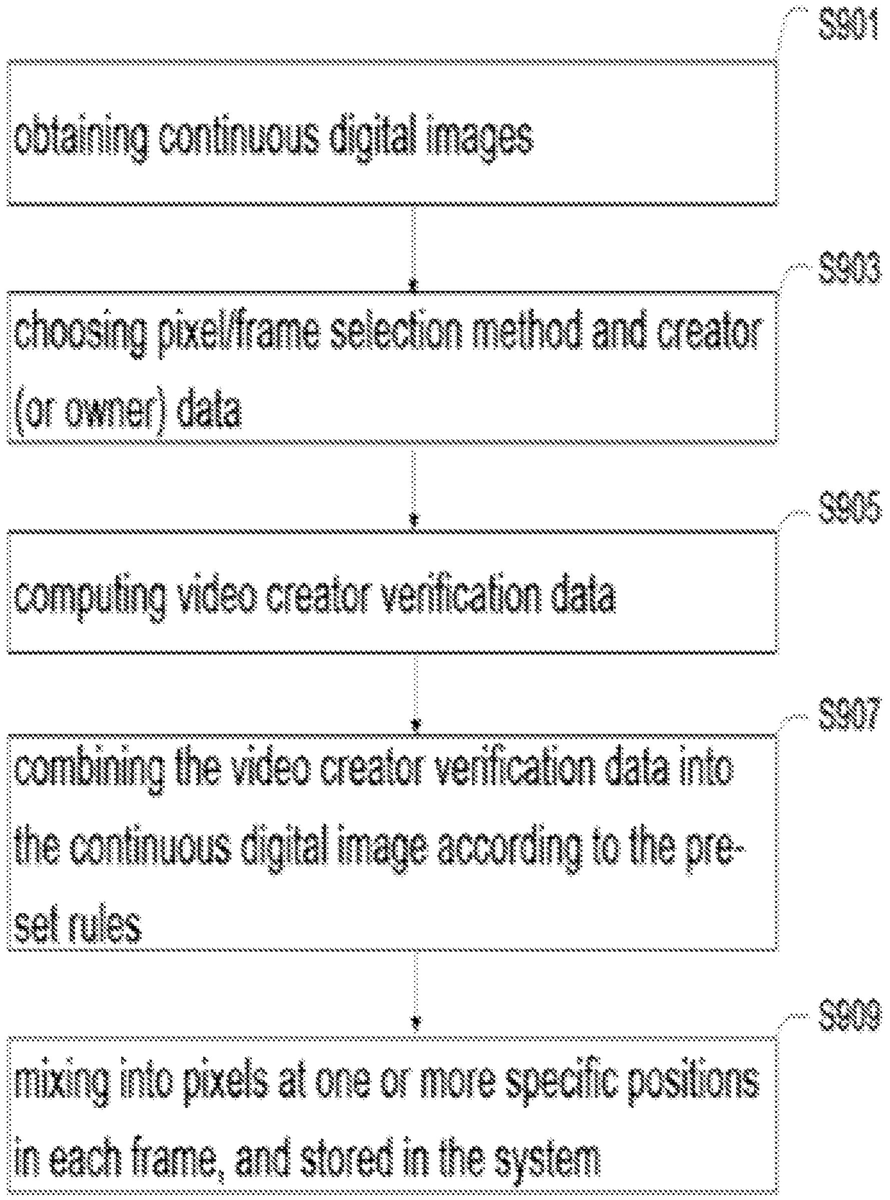
FIG. 9 illustrates an embodiment diagram of the flow process for forming work substantiation data for continuous digital image.

For continuous digital images (e.g., video), as shown in FIG. 9, the process begins with, obtaining continuous digital images first (step S901); choosing the information to make substantiation data, for example, according to the predetermined sampling method of pixel selection by the pixel value, position, or frame selection (selecting specific one or more frames). When creator or owner information are obtained, computing video creator substantiation data based on the creator (or owner) data (step S905). Next, combining the video creator substantiation data into the continuous digital image according to the pre-set rules (step S907). The pre-set rule is to set that the video creator substantiation data can be mixed into one or more frames in the selected continuous digital image, and mixed into pixels at one or more specific positions in each frame, and stored in the system (work substantiation platform) after completion (step S909). In an embodiment, the method of selecting frame, pixel position, and creator information can be proprietary, and only the authenticator can conduct identification based on it.

When the work is a static image, the pre-determined method can be to set the substantiation data to be mixed into one or more pixel positions in the image file of the corresponding work, wherein the position (such as in the form of coordinates) can be recorded in the specific file and saved by the system so that the substantiation data can be used for substantiating the work in the future.

Figure 10:
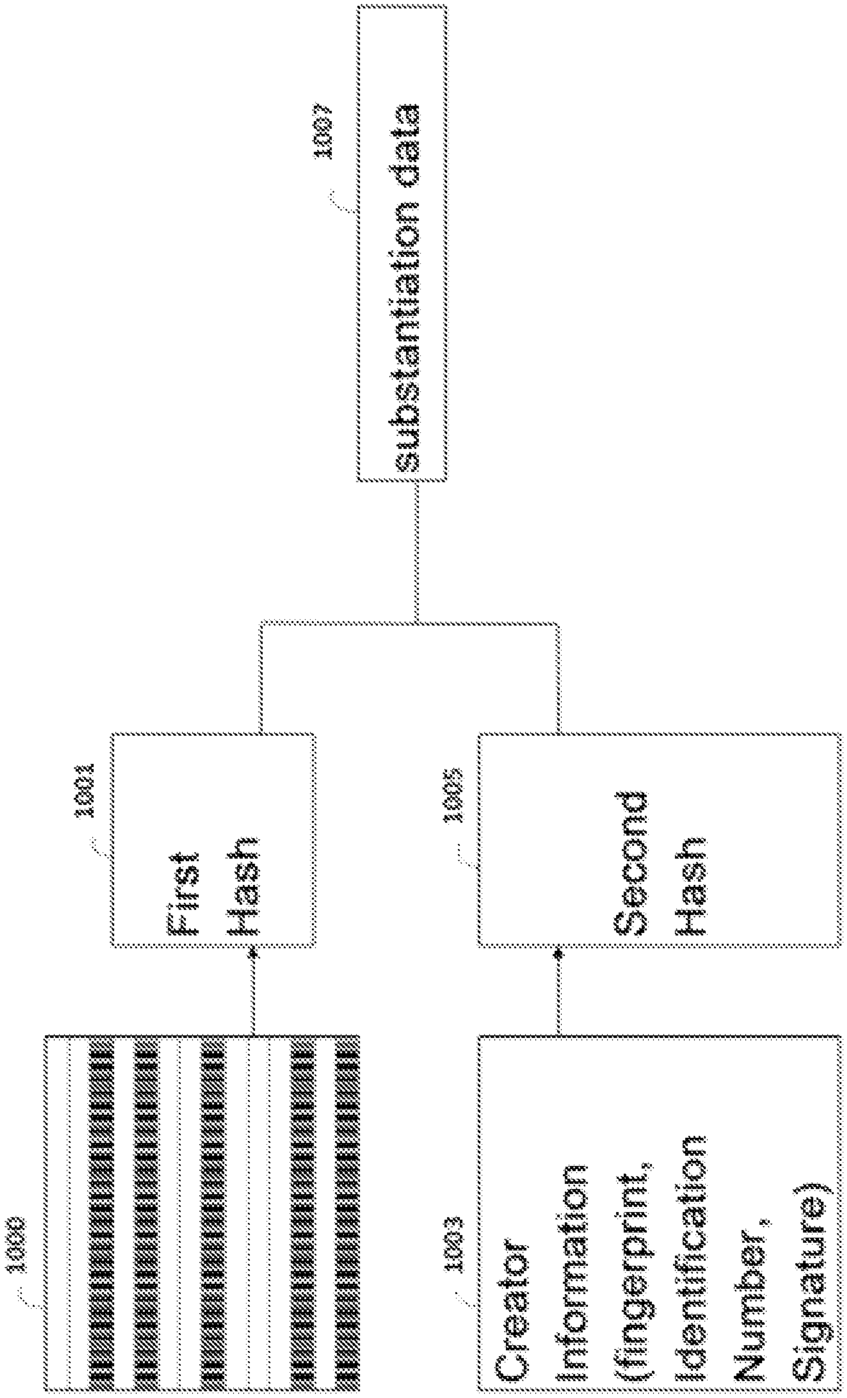
FIG. 10 illustrates a schematic diagram of an embodiment of combining creator-related data to digital images.

FIG. 10 illustrates a schematic diagram of an embodiment of combining creator-related information into digital images, comprising: providing a digital image 1000, according to the predetermined methods, for example, selecting one or more rows in the digital image 1000; extracting the pixel values, and using the hash algorithm to compute the hash values of each selected column. If multiple columns are selected, the hash values can be added or concatenated to obtain the first hash value 1001. For creator-related information 1003 (such as fingerprint, member identification code, signature, etc.), it comprises: using the hash algorithm to compute the second hash value 1005; and combining the first hash value 1001 and the second hash value 1005 to obtain the amalgamated substantiation data 1007 of image.

Creator information 1003 can be any information that can be used to identify the creator or owner, such as the creator or owner's fingerprint, member identification code, or signature of the work substantiation platform, or other identity information. In an embodiment, the signature used for calculating and substantiating the data may be the creator's signature handwriting, the handwriting and strength of the signature. The handwriting may be the position track of the signature in record; and the strength of the signature may also be recorded during the signing process, which may be used to compute and generate creator substantiation data.

When the amalgamated substantiation data is obtained, the substantiation data can also be set to be mixed with pixels at one or more positions in the image or video file according to the predetermined method, which may also be used to set the amalgamated substantiation data to be mixed into one or more frames, and to one or more pixel positions within each frame. The information used to compute and substantiate data can also be set with different intensities according to the importance attribute of the work; for example, the work can be set as a critical, high, medium, low importance according to the attribute of the work. In an embodiment, when the creator of the work is unknown or anonymous, the owner's information can be used as one of the bases for substantiating the genuineness of the work.

Based the above-mentioned method, through the above-mentioned method, various combinations of works, owners, blending re-creation works, new owners, style data, etc. can be computed to substantiate the genuineness; this approach may prevent the works from being tampered with, and ensure the authenticity of the works with relevant substantiation data hidden and embedded. These data can be encrypted and stored by the server system or distributed system, and can be obtained for authentication.

The above disclosed content is only some preferred feasible embodiments of the present invention, and is not therefore limiting the patent scope of the present invention. All equivalent technical changes made by using the description of the present invention and the contents of the drawings are within the scope of this invention.

What is claimed is:

1. A method for forming work amalgamated substantiation data for authentication, implemented in a system, the method comprising steps of:

storing, in a work substantiation platform comprising a database or in a distributed system, digital images of each work, information related to creators and/or owners of said each work and history of said each work comprising image files of said each work and re-creation history of said each work;

obtaining an image file of a work along with information of the work, wherein the information of the work comprises information of a creator or an owner;

extracting pixel data of the image file;

computing a work substantiation data of the work based on the pixel data of the image file;

computing a creator substantiation data of the work based on the information of the creator or the owner of the work, wherein the work substantiation data and the creator substantiation data are computed by utilizing at least one of algorithms comprising hash algorithm, lossless compression, error-correction encoding, and/or encryption algorithm;

combining the work substantiation data of the work with the creator substantiation data of the work to generate an amalgamated work substantiation data of the work; and integrating the amalgamated work substantiation data into the image file of the work and/or a tangible work, wherein the image file, the creator substantiation data and the amalgamated work substantiation data are transmitted to an authenticator or a user of the system to substantiate genuineness and integrity of the work.

2. The method of claim 1, wherein the work represents a first work stored in the system, and wherein the method further comprising the steps of:

obtaining the first work, information of the first work, and a first amalgamated work substantiation data from the system;

wherein the information of the first work comprises information of a first creator and/or a first owner of the first work;

re-creating the first work to produce a second work;

obtaining pixel data from an image file of the second work;

obtaining information of a second creator or a second owner of the second work, computing a second work substantiation data of the second work based on the pixel data obtained from the image file of the second work;

computing a second creator substantiation data of the second work based on the information of the second creator and/or the second owner of the work;

combining the second work substantiation data with the second creator substantiation data to generate a second amalgamated work substantiation data of the second work; and transmitting the image file of the second work, the second creator substantiation data of the second work, and the second amalgamated work substantiation data of the second work to the authenticator or the user of the system to substantiate the genuineness and integrity of the second work.

3. The method of claim 2, wherein the re-creating of the first work is performed by a style, comprising:

obtaining the first amalgamated work substantiation data of the first work;

extracting pixel data of an image file of the style;

obtaining creator information of the style, wherein the creator information of the style includes information of a creator or an owner of the style;

computing the style based on the pixel data of the style and the creator information of the style;

applying the style to the first work to generate the second work.

4. The method of claim 1, wherein the method further comprising the steps of:

obtaining, by using a scanning or a photography process, an image data of the tangible work, and obtaining a work substantiation data of the image data;

detecting, by using an artificial intelligence process, attributes of different blocks in the tangible work;

determining, within the tangible work, a location to incorporate the creator substantiation data to the tangible work;

amalgamating, by appending or drawing, the creator substantiation data to the work;

in response to the determining, incorporating the creator substantiation data to the tangible work;

obtaining, using the scanning or the photography process, an amalgamated work substantiation data of the tangible work with the incorporated creator substantiation data;

combining the image file of the work with the creator substantiation data and the amalgamated work substantiation data to obtain a paired bundle data; and encode and store the paired bundle data in a data system.

5. The method of claim 4, wherein the tangible work is scanned with a three-dimensional scanning technology and stored in the system along with the creator substantiation data and the amalgamated work substantiation data of the work.

6. The method of claim 1, wherein the work substantiation data of the work and the creator substantiation data of the work are mixed into the image file based on a predetermined method process.

7. The method of claim 6, wherein the predetermined method process comprising:

setting the work substantiation data of the work and/or the creator substantiation data of the work to be incorporated into one or more specific pixel positions in a still image file; or setting the work substantiation data and/or the creator substantiation data to be incorporated into one or more specific pixel positions of one or more specific frames in a dynamic image file.

8. The method of claim 1, wherein when the creator of the work is unknown or anonymous, the information of the owner is used as one of basis for substantiating the genuineness and integrity of the work.

9. The method of claim 1, wherein the information used to compute the creator substantiation data comprising:

handwritten signature of the creator;

handwriting track and strength, at each position, of the handwritten signature of the creator;

biological characteristics of the creator;

identity data of the creator; and/or encoded non-public information during creation of the work.

10. A system for forming work amalgamated substantiation data for authentication, the system comprising:

one or more electronic devices;

a work substantiation platform connected with the one or more electronic devices through a computer network, the work substantiation platform comprising a processor coupled to a database or a distributed system that store information including digital images of each work, substantiation data, information related to creators and/or owners of said each work and history of said each work comprising image files of said each work and re-creation history of said each work, wherein the processor is configured to perform method steps of:

obtaining an image file of a work along with information of the work that includes information of a creator or an owner;

extracting pixel data of the image file;

computing a work substantiation data of the work based on the pixel data of the image file;

computing a creator substantiation data of the work based on the information of the creator or the owner of the work, wherein the work substantiation data and the creator substantiation data are computed by utilizing at least one of algorithms comprising hash algorithm, lossless compression, error-correction encoding, and/or encryption algorithm;

combining the work substantiation data with the creator substantiation data to generate amalgamated work substantiation data of the work; and integrating the generated amalgamated work substantiation data into the image file of the work and/or a tangible work, wherein the image file, the creator substantiation data and the generated amalgamated work substantiation data are transmitted to an authenticator or a user of the one or more electronic devices to substantiate genuineness and integrity of the work.

11. The system of claim 10, wherein the work represents a first work stored in the system, and wherein the processor is further configured to perform the method steps of:

obtaining the first work, information of the first work, and a first amalgamated work substantiation data from the system;

wherein the information of the first work comprises information of a first creator and/or a first owner of the first work;

re-creating the first work to produce a second work;

obtaining pixel data from an image file of the second work;

obtaining information of a second creator and/or second owner of the second work, computing a second work substantiation data of the second work based on the pixel data obtained from the image file of the second work;

computing a second creator substantiation data of the second work based on the information of the second creator and/or the second owner of the work;

combining the second work substantiation data with the second creator substantiation data to generate a second amalgamated work substantiation data of the second work; and transmitting the image file of the second work, the second creator substantiation data of the second work, and the second amalgamated work substantiation data of the second work to the authenticator or the user of the one or more electronic devices to substantiate the genuineness and integrity of the second work.

12. The system of claim 11, wherein the re-creating of the first work is performed by a style, comprising:

obtaining the first amalgamated work substantiation data of the first work;

extracting pixel data of an image file of the style;

obtaining creator information of the style, wherein the creator information of the style includes information of a creator or an owner of the style;

computing the style based on the pixel data of the style and the creator information of the style;

applying the style to the first work to generate the second work.

13. The system of claim 11, wherein, in the system, the authenticator or the user is able to perform functions comprising:

previewing the work in low resolution, thumbnail, gray scale, and/or altered style;

looking up history of the work, and displaying in a tree diagram the history of the work.

14. A method for forming work amalgamated substantiation data for authentication, implemented in a system, the method comprising steps of:

storing, in a work substantiation platform comprising a database or in a distributed system, digital images of each work, information related to creators and/or owners of said each work, and history of said each work comprising image files of said each work and re-creation history of said each work;

obtaining a first work, information of the first work, and a first amalgamated work substantiation data from the system;

wherein the information of the first work comprises information of a first creator and/or a first owner of the first work;

re-creating the first work to produce a second work;

obtaining pixel data from an image file of the second work;

obtaining information of a second creator and/or a second owner of the second work;

computing a work substantiation data of the second work based on the pixel data obtained from the image file of the second work;

computing a creator substantiation data of the second work based on the information of the second creator or the second owner of the work, wherein the work substantiation data and the creator substantiation data are computed by utilizing at least one of algorithms comprising hash algorithm, lossless compression, error-correction encoding, and/or encryption algorithm;

combining the work substantiation data with the creator substantiation data to generate a second amalgamated work substantiation data of the second work; and transmitting the image file of the second work, the creator substantiation data of the second work, and the second amalgamated work substantiation data of the second work to an authenticator or user of the system to substantiate genuineness and integrity of the second work.

15. A system for forming work amalgamated substantiation data for authentication, the system comprising:

one or more electronic devices;

a work substantiation platform connected with the one or more electronic devices through a computer network, the work substantiation platform comprising a processor coupled to a database or a distributed system that stores information including digital images of each work, substantiation data, information related to creators and/or owners of said each work and history of said each work comprising image files of said each work and re-creation history of said each work, wherein the processor is configured to perform method steps of:

obtaining a first work, information of the first work, and a first amalgamated work substantiation data from the system;

wherein the information of the first work comprises information of a first creator and/or a first owner of the first work;

re-creating the first work to produce a second work;

obtaining pixel data from an image file of the second work;

obtaining information of a second creator and/or a second owner of the second work;

computing a work substantiation data of the second work based on the pixel data obtained from the image file of the second work;

computing a creator substantiation data of the second work based on the information of the second creator or the second owner of the work, wherein the work substantiation data and the creator substantiation data are computed by utilizing at least one of algorithms comprising hash algorithm, lossless compression, error-correction encoding, and/or encryption algorithm;

combining the work substantiation data with the creator substantiation data to generate a second amalgamated work substantiation data of the second work; and transmitting the image file of the second work, the creator substantiation data of the second work, and the second amalgamated work substantiation data of the second work to an authenticator or user of the one or more electronic devices to substantiate genuineness and integrity of the second work.

* * * * *